United States Patent [19]
Hirschman

[11] Patent Number: 5,483,303
[45] Date of Patent: Jan. 9, 1996

[54] SPECTACLES HAVING ADJUSTABLE TEMPLES AND EAR ENGAGING MEMBERS

[75] Inventor: Richard Hirschman, Albertson, N.Y.

[73] Assignee: Hudson Optical Corporation, Bohemia, N.Y.

[21] Appl. No.: 247,265

[22] Filed: May 23, 1994

[51] Int. Cl.$^6$ ........................................................ G02C 5/20
[52] U.S. Cl. ................................ 351/118; 351/85; 351/119
[58] Field of Search ..................................... 351/118, 119, 351/114, 116, 117, 121, 122, 123, 140, 44, 47, 57, 85, 84, 86, 89, 91, 92, 103, 106, 108, 124

[56] References Cited

U.S. PATENT DOCUMENTS

| | | |
|---|---|---|
| 1,910,743 | 10/1929 | Bouchard . |
| 3,476,467 | 11/1969 | Curry . |
| 3,620,608 | 11/1971 | Davis . |
| 3,649,106 | 3/1972 | Hirschmann . |
| 4,012,130 | 3/1977 | Guillet . |
| 4,026,640 | 5/1977 | Everburg . |
| 4,544,245 | 10/1985 | Stansbury . |
| 4,917,479 | 4/1990 | Bidgood . |
| 4,955,708 | 9/1990 | Kahaney . |
| 5,007,727 | 4/1991 | Kahaney . |
| 5,033,837 | 7/1991 | Leonardi . |
| 5,096,284 | 3/1992 | NakaMats . |
| 5,386,254 | 1/1995 | Kahaney .................................. 351/85 |

*Primary Examiner*—William L. Sikes
*Assistant Examiner*—Hung Xuan Dang

[57] ABSTRACT

A pair of spectacles which can be adjusted to accommodate the size and contour requirements of any wearer includes an eye shield attached to an eye shield frame. The eye shield frame has a groove for receiving a coin or similar object which is used to forcibly dislodge the shield from the shield frame to allow for replacement of the shield. Attached to the eye shield frame is a pair of temples each including an outer housing which has a plurality of holes formed on a side surface thereof and is rotatably attached to a pin located within the eye frame member. An inner sleeve with an interconnected adjustable ear engaging member is located within the outer housing. The inner sleeve includes a circular raised portion formed on an inner side surface and a stop member located on a bottom surface. The circular raised portion of the inner sleeve fits into any of the circular holes formed in the outer housing. The length of the temple can be adjusted by moving the inner sleeve relative to the outer housing such that the raised portion on the inner sleeve moves into another of the circular holes of the outer housing. The stop member on the bottom surface of the inner sleeve prevents the inner sleeve from being removed from the outer housing and provides a visual indication of the adjusted length of each temple.

15 Claims, 2 Drawing Sheets

SPECTACLES HAVING ADJUSTABLE TEMPLES AND EAR ENGAGING MEMBERS

This application is related to U.S. Design Applications 016,802 and 016,804, both filed on Dec. 3, 1993 by the present inventor.

BACKGROUND OF THE INVENTION

1. Field of the Invention

The present invention relates to spectacles such as safety glasses, and more specifically, to spectacles having easily adjustable temple members combined with flexible ear engaging members including an eye shield or lens that is easily removable and a visual indicator of the adjusted length of the temples.

2. Description of the Related Art

Conventional spectacles generally have a shield or lens to cover a wearer's eyes along with temples and ear engaging members that are not adjustable to the size of a particular wearer's head or the shape of a wearer's ear. Thus, most conventional safety spectacles must be made in several different sizes and one particular spectacle cannot be used for every wearer.

In addition, the lens or eye shield of spectacles often become scratched or damaged during extensive use. Consequently, the spectacles including the entire frame assembly and lens or eye shield are frequently discarded and replaced with new spectacles. Conventional safety spectacles are not constructed to readily and securely allow only the damaged lens or eyepiece to be removed and replaced.

U.S. Pat. Nos. 3,649,106, 4,012,130 and 4,026,640 teach the use of an adjustable ear engaging member connected to a temple to allow a wearer to adjust the ear engaging member to the shape of that individual wearer's ear. None of these temples have a device for adjusting the length of the temple or the location where the ear engaging member engages a wearer's ear.

U.S. Pat. No. 3,620,608 teaches spectacles including adjustable temples 22a' shown in FIG. 6 which are connected to an ear engaging member 22d' by a rivet 50 or snap fastener 52a, 52b. To adjust the length of the temple and the location where the ear engaging member fits onto a wearer's ears, the wearer must remove the rivets 50 or snap fasteners 52a, 52b from holes located in the temple 22a' and then re-insert the rivets or snap fasteners into the holes in the temple 22a' at a desired location. The adjustment process is complicated because the wearer must separate, reposition and then reattach the ear engaging member 22d' to the temple 22a' to make an adjustment in size. As shown in FIG. 9, the ear engaging member 22d' may be formed of a soft pliable plastic which surrounds a soft flexible wire 74 to permit the ear engaging member to be shaped to any desired configuration to fit a wearer's head and ears.

U.S. Pat. No. 5,096,284 teaches similar spectacles which include an expandable temple member shown in FIG. 2. The telescopic temple member 22 has a plurality of nested portions 23, 24 and 25 which allow the length of the temples to be altered. The nested portions 23–25 fit inside the telescopic member 22 when the glasses are not in use. The temples do not have an adjustable ear engaging portion.

U.S. Pat. No. 4,917,479 discloses spectacles having a temple 21 connected to an earhook 11 by a sleeve 26. The sleeve 26 is riveted to holes 24 to connect the earhook 11 to the temple 21. The sleeve 26 can be made in sizes of various lengths to accommodate the requirements of different wearers. However, the sleeve is riveted to the temple and after an appropriate length of the temple is selected, the length of the temple is not adjustable because the earhook 11 and sleeve 26 are riveted together.

U.S. Pat. No. 1,910,743 teaches trial spectacles having a temple which is formed of two connected temple members 10 and 11. Members 10 and 11 are connected by a spring loaded temple adjusting member 15, 16, 17 which allows the length of the temple to be adjusted to measure the length of a temple required for a particular wearer. The length of the temple is adjusted by moving member 10 relative to member 11. These spectacles do not have an adjustable ear member and the spring loaded temple adjusting member is cumbersome and difficult to adjust.

U.S. Pat. No. 3,476,467 discloses a spectacle frame having a temple 3 with a groove 9 formed therein to receive an ear engaging abutment bar 2. The bar 2 is movable along the groove 9 to a desired position. Once the bar is located in a desired position, a lateral cam element 8 formed on the bar 2 is rotated so that the sharp corners 8" of the cam element dig into the undercut portions of the groove 9 to secure the bar 2 in position. These spectacles do not have an adjustable ear engaging member. Also, the adjustment of the temple length is difficult because it requires a wearer to locate a desired position of the ear engaging member and then hold the ear engaging member in position while rotating a bar to secure the desired position.

U.S. Pat. No. 4,544,245 teaches safety spectacles having an adjustable length temple 24. The temple includes a side arm 28 that is movably fitted within the temple 24. Side arm 28 has serrations 60 on an upper portion which cooperate with a projection 56 formed within the temple 24 to hold the side arm 28 within the temple 24. The length of the temple can be adjusted by sliding the side arm 28 in and out of the temple 24. However, the temple does not include an adjustable ear engaging member or a visual indication of the adjusted length of the temple.

U.S. Pat. Nos. 4,955,708 and 5,007,727 disclose sunglasses having an adjustable temple connected to a flexible ear engaging member. These sunglasses do not have a visual indicator of the adjusted length of each temple and do not include any structure for removing the eye shield.

Based on the prior art described above, there exists a need for spectacles that have adjustable temple members in combination with adjustable ear engaging members that provide a visual indicator of the adjusted length of each temple. Also, there is a need for spectacles in which a eye shield or lens is quickly and easily removable and replaceable.

SUMMARY OF THE INVENTION

An advantage of the present invention is that the spectacles overcome the problems with the prior art discussed above. The spectacles can be easily and quickly adjusted to accommodate the size and contour requirements of ally wearer. Another advantageous feature is that the temples of the spectacles can be easily and quickly extended or contracted and the ear engaging members can be easily adjusted to conform to a wearer's ears. Further, the spectacles provide a visual indication of the adjusted length of each temple so a wearer can easily and accurately adjust the lengths of the temples so that the lengths are equal. The spectacles may also include a removable eye shield or lens so that a worn or scratched eye shield or lens can be replaced with a new one.

According to one embodiment of the invention, the spectacles may include an eye shield attached to an eye shield frame. The eye shield preferably includes a nose bridge seat that rests on the bridge of a wearer's nose. The eye shield frame may include a forehead engaging member made of soft material to provide comfort to the wearer at the point where the top of the shield frame contacts the wearer's forehead. The shield and shield frame may also have a notch or groove which allows a wearer to insert a coin or similar object and force the shield out of the notch to allow the eye shield to be removed from the frame. This allows many different types of replacement eye shields and lenses to be inserted in the same frame.

Attached to the eye shield frame is a pair of temples each of which includes an outer housing rotatably attached to a pin located within the eye shield frame. The outer housing preferably includes a plurality of holes formed on an inner side thereof and an elongated hole formed on the bottom of the outer housing.

Located within the outer housing of each temple may be an inner sleeve which has a circular raised portion formed on an inner side surface and a stop member in the form of a raised portion located on a bottom surface. The circular raised portion fits into any of the circular holes formed in the outer housing. The length of the temple can be adjusted by moving the inner sleeve relative to the outer housing such that the raised portion on the inner sleeve moves into one of the circular holes of the outer housing. The stop member on the bottom surface of the inner sleeve prevents the inner sleeve from being removed from the outer housing. In addition, the stop member is visible through the elongated hole formed on the bottom of the outer housing. The location of the stop member allows a wearer to see in which of the circular holes of the outer housing the circular raised portion of the inner sleeve is engaged. This allows the wearer to adjust the other temple to the same position as a temple that has already been properly adjusted.

The inner sleeve also may also have an ear engaging member fixed thereto. The ear engaging member is easily adjustable to conform to the shape of a wearer's ear. The ear engaging member is flexible enough to allow a wearer to easily adjust its shape but firm enough to retain the desired shaped once the wearer has completed the adjustment.

Other features and advantages of the present invention will become apparent from the following description of the preferred embodiments with reference to the accompanying drawings.

DETAILED DESCRIPTION OF AN EMBODIMENT OF THE INVENTION

Figure 1:
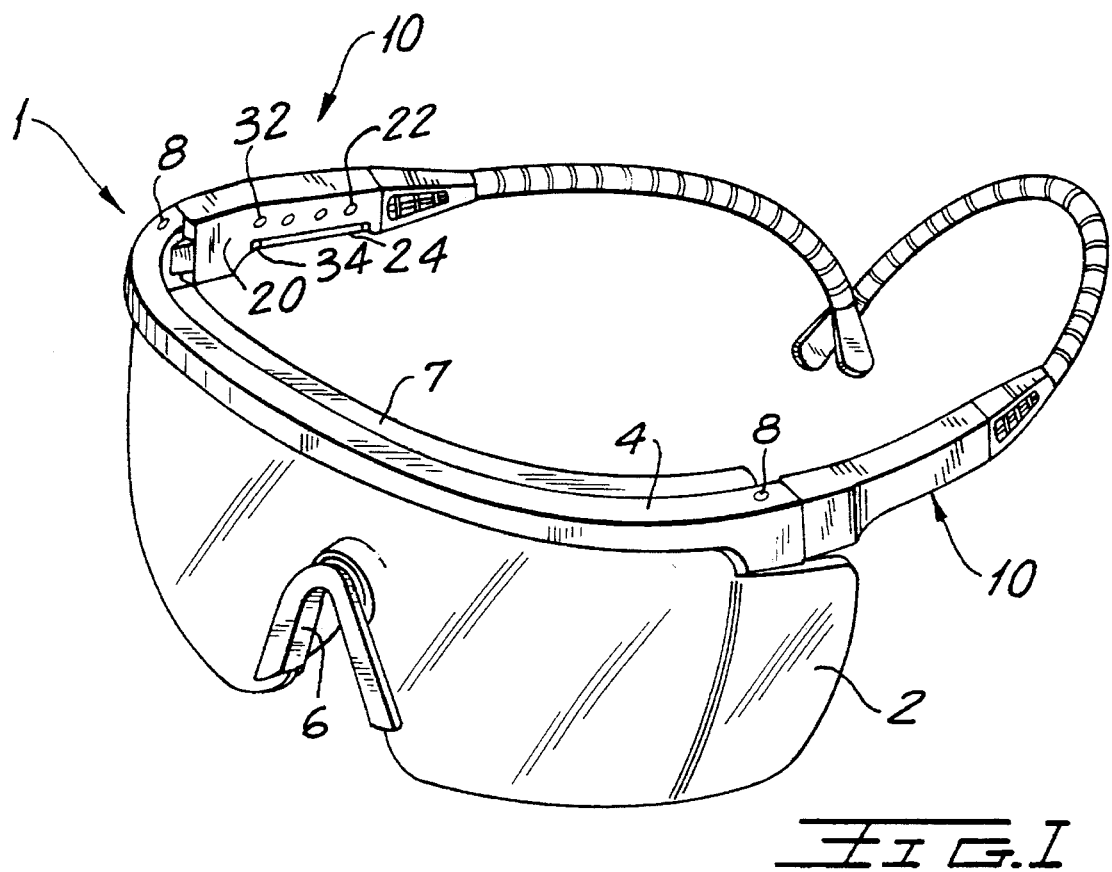
FIG. 1 is a perspective view of the spectacles of the present invention.

Referring now to the drawings where like reference numerals indicate like elements, the spectacles 1 are shown in FIG. 1. While these spectacles are intended for use as safety spectacles, the inventive aspects described herein can be readily adapted to sunglasses and any other type of spectacles.

The spectacles 1 include an eye shield 2 and an eye shield frame 4. Eye shield 2 may alternatively be formed with two separate shields or lenses to cover each eye and with an appropriately shaped frame to accommodate each eye shield or lens.

Located on the eye shield 2 is a nose bridge seat 6 which may preferably have a soft material located thereon to contact a wearer's nose to provide for comfort. A forehead engaging member 7 is located along the frame 4 and is made of a soft material to provide comfort at the point where the frame contacts a wearer's forehead. The shield frame 4 includes a pair of pins 8 located at two opposite ends of the frame.

A temple, generally designated by 10, is rotatably attached to each of the pins 8. Each temple includes an outer housing 20, an inner sleeve 30 located within the outer housing 20 and an ear engaging member 40 attached to the inner sleeve 30. The outer housing 20 is formed of a hard material such as plastic and includes a plurality of circular holes 22 formed on an inner side thereof. Outer housing 20 also includes an elongated slot 24 formed on a lower surface thereof.

Figure 2:
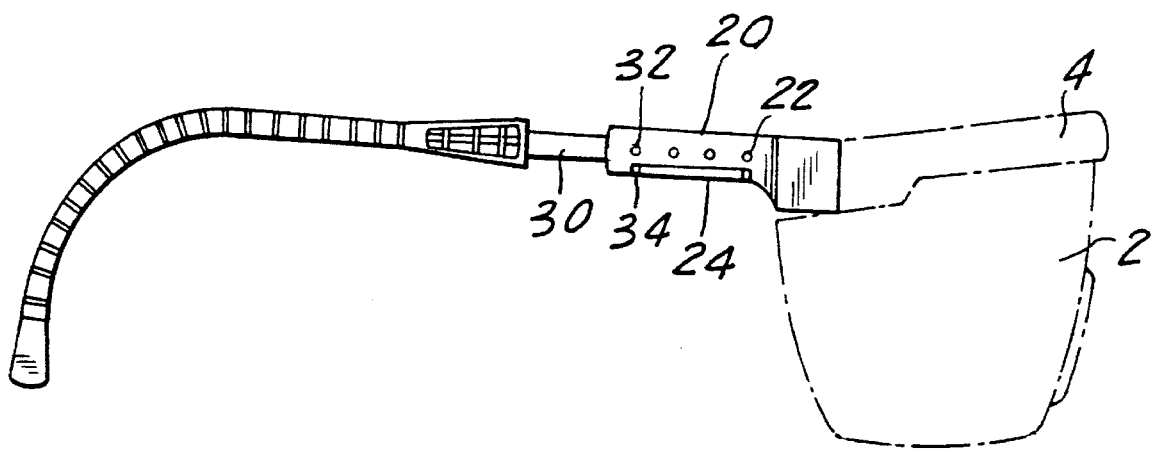
FIG. 2 is a side view of the spectacles shown in FIG. 1.

As seen more clearly in FIG. 2, the inner sleeve 30 is slidably located within the outer housing 20 and is formed of the same hard material used to form the outer housing 20. The length of the temple 10 can be expanded and contracted by moving inner sleeve 30 within the outer housing 20.

The inner sleeve has a circular raised member 32 located on an inner side portion thereof. The circular raised member 32 engages with any of the circular holes 22 formed in the outer housing 20. The sleeve 30 includes a stop member 34 in the form of a raised portion located on a bottom of the sleeve 30. The stop member 34 engages with one end of the elongated slot 24 to prevent the inner sleeve 32 from being removed from the outer housing 20 when the temple is fully expanded as seen in FIG. 2.

When the temple is fully contracted as seen in FIG. 1, the movement of the inner sleeve 30 relative to the outer housing 20 is limited by the end of the sleeve 30 contacting an end of the outer housing 20. Further, the stop member 34 is aligned with the one of the plurality of circular holes 22 where the circular raised portion 32 of the sleeve 30 is located. Thus, the stop member 34 provides an indication of the adjustment location of the inner sleeve 30 relative to the housing 20 because the stop member 34 is visible through the elongated slot 24 of the outer housing 20.

Figure 3:
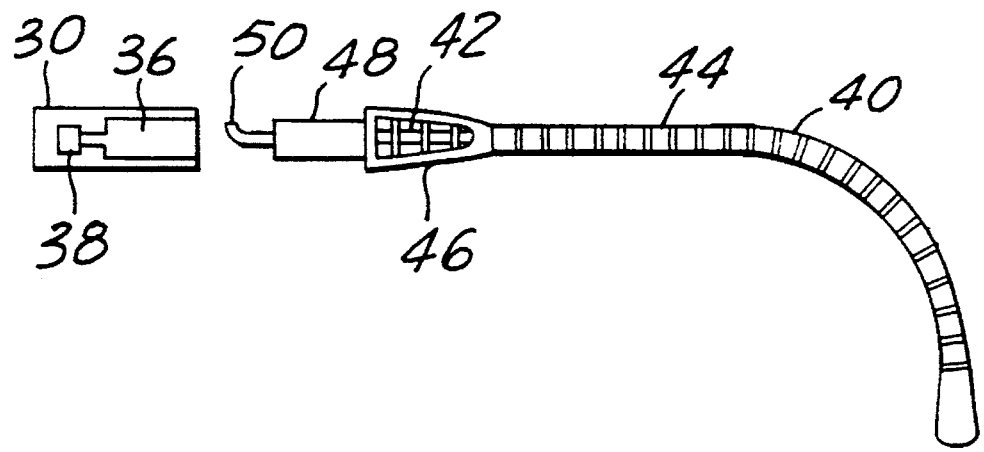
FIG. 3 is a perspective view of the components of the inner sleeve 30 and ear engaging member 40.

The inner sleeve 30 also includes a hole 38 and an elongated groove 36 as seen in FIG. 3 which are used to attach the ear engaging member 40 to the sleeve 30 as described below.

As seen in FIG. 3, the ear engaging member 40 includes a flexible cable 42 located in a soft, pliable outer covering 44. The cable 42 is flexible enough to be easily deformed by a wearer applying pressure thereto but is strong enough to retain a shape provided by the pressure. The cover 44 surrounding the cable 42 is made of a soft, pliable material to provide comfort to the wearer. The cable 42 has at one end a hard plastic connecting member 46 which includes a tongue 48 formed of a hard material such as metal or plastic. In contrast to the material used to form the cable 42, the tongue 48 and connecting member 46 are hard and cannot be bent by the wearer applying pressure thereto. The tongue 48 has a hook member 50 located at the end thereof which is formed of the same material used to form the tongue 48.

The hook member 50 fits into the hole 38 formed in the inner sleeve 30. The tongue 48 fits into the elongated groove 36 of the inner sleeve. Thus, the tongue 48 and hook member 50 are fixed in the inner sleeve 30.

Figure 4:
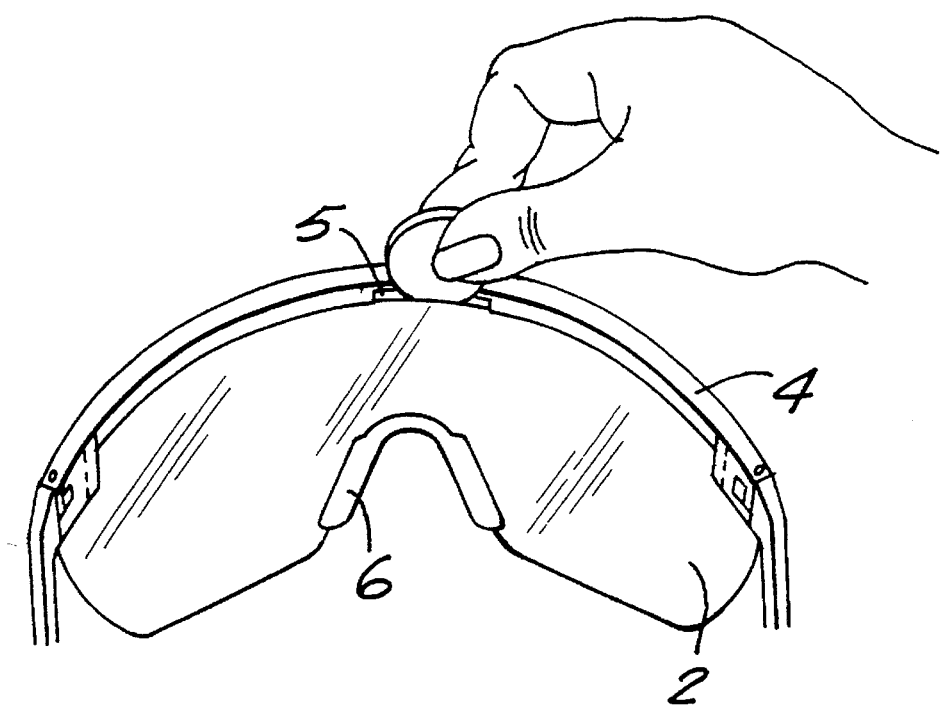
FIG. 4 is a planar view of the interior of the spectacles including a groove for removing the eye shield.

To adjust the length of a temple, a wearer only has to pull or push slightly on the connecting member 46 while holding the outer sleeve 20. This will cause the circular raised portion 32 of the inner sleeve 30 to move into an adjacent circular hole 22 of the outer housing 20. Because the circular raised portion 32 is press-fitted in the circular hole 22, the inner sleeve 30 will not move relative to the outer housing 20 until subsequent force is applied by the wearer. The wearer can adjust the other temple in the same manner and can check that the length of the temples match by checking the position of the stop members As seen in FIG. 4, a groove 5 can be provided in the interior of the frame 4 to allow a wearer to remove the shield 2 from the frame 4. To do so, a wearer only has to insert a coin or similar object into the groove 5 and apply pressure to dislodge the shield 2 from retaining cavities provided on either side of the frame 4. Thus, the groove 5 allows for easy and quick replacement of the shield 2.

Although the present invention has been described in relation to a particular embodiment thereof, many other variations and modifications and other uses will become apparent to those skilled in the art. It is preferred, therefore, that the present invention be limited not by the specific disclosure herein, but only by the appended claims.

What is claimed is:

1. Spectacles comprising:
   a) a frame;
   b) an eye shield located in said frame; and
   c) a pair of temples attached to said frame, each of said temples including:
   1) an outer housing attached to said frame;
   2) an inner sleeve slidably located within said outer housing;
   3) an adjustable ear engaging member attached to said inner sleeve; and
   4) an indicator for indicating a location of said inner sleeve relative to said outer housing; wherein
   said indicator comprises an elongated slot formed in a bottom portion of said outer housing and a stop member located on said inner sleeve to be visible through said elongated slot and to provide an indication of a location of said inner sleeve relative to said outer housing.

2. Spectacles as recited in claim 1, wherein said stop member is arranged to contact said outer housing to prevent said inner sleeve from being removed from said outer housing.

3. Spectacles as recited in claim 1, wherein said outer housing has an inner side portion including a plurality of holes formed therein and said inner sleeve has a raised member formed thereon for engaging with one of said plurality of holes on said inner side portion of said outer housing.

4. Spectacles as recited in claim 1, wherein said adjustable ear member includes a flexible wire and a pliable material surrounding said flexible wire.

5. Spectacles as recited in claim 1, further comprising a groove formed in said frame to have a shape for receiving and cooperating with a force applying member to forcibly dislodge the eye shield from the frame.

6. Spectacles comprising:
   a) a frame;
   b) an eye shield located in said frame; and
   c) a pair of temples attached to said frame, each of said temples including:
   1) an outer housing attached to said frame;
   2) an inner sleeve slidably located within said outer housing;
   3) an adjustable ear engaging member attached to said inner sleeve; and
   4) an indicator for indicating a location of said inner sleeve relative to said outer housing; wherein
   said inner sleeve includes a hole and an elongated groove formed therein and said adjustable ear engaging member comprises a connecting member, a tongue extending from said connecting member and a hook formed at one end of the tongue, said tongue being located in said elongated groove and said hook being located in said hole in said inner sleeve.

7. Spectacles comprising:
   a) a frame;
   b) an eye shield located in said frame;
   c) a pair of temples attached to said frame; and
   d) a groove formed in said frame to have a shape for receiving and cooperating with a force applying member to forcibly dislodge the eve shield from the frame.

8. Spectacles as recited in claim 7, wherein said groove is located at a center position of said frame.

9. Spectacles as recited in claim 7, wherein each of said temples includes:
   1) an outer housing attached to said frame;
   2) an inner sleeve slidably located within said outer housing;
   3) an adjustable ear engaging member attached to said inner sleeve; and
   4) an indicator for indicating a location of said inner sleeve relative to said outer housing.

10. Spectacles as recited in claim 9, wherein said indicator comprises an elongated slot formed in a bottom portion of said outer housing and a stop member located on said inner sleeve to be visible through said elongated slot and to provide an indication of a location of said inner sleeve relative to said outer housing.

11. A temple for a pair of spectacles, the temple comprising:
    a) an outer housing;
    b) an inner sleeve slidably located within said outer housing; and
    c) an adjustable ear engaging member attached to said inner sleeve; and
    d) an indicator for indicating a location of said inner sleeve relative to said outer housing; wherein
    said indicator comprises an elongated slot formed in a bottom portion of said outer housing and a stop member located on said inner sleeve to be visible through said elongated slot and to provide an indication of a location of said inner sleeve relative to said outer housing.

12. A temple as recited in claim 11, wherein said stop member is arranged to contact said outer housing to prevent said inner sleeve from being removed from said outer housing.

13. A temple as recited in claim 11, wherein said outer housing has an inner side portion including a plurality of holes formed therein and said inner sleeve has a raised member formed thereon for engaging with one of said plurality of holes on said inner side portion of said outer housing.

14. A temple as recited in claim 11, wherein said adjustable ear member comprises a flexible wire and a pliable material surrounding said flexible wire.

15. A temple for a pair of spectacles, the temple comprising:
   a) an outer housing;
   b) an inner sleeve slidably located within said outer housing; and
   c) an adjustable ear engaging member attached to said inner sleeve; and
   d) an indicator for indicating a location of said inner sleeve relative to said outer housing; wherein said inner sleeve comprises a hole and an elongated groove formed therein and said adjustable ear engaging member comprises a connecting member, a tongue extending from said connecting member and a hook formed at one end of the tongue, said hook is fixed in said hole in said inner sleeve and said tongue is fixed in said elongated groove in said inner sleeve.

* * * * *